July 16, 1963 L. GAUCHER 3,097,436
METHOD AND MEANS FOR THE SIMULATION OF THE ACTION
OF MECHANICAL PARAMETERS ON A BODY
Filed Jan. 18, 1961 3 Sheets-Sheet 1

Inventor:
Louis Gaucher
By
Kenyon, Palmer, Stewart & Estabrook
Attorneys

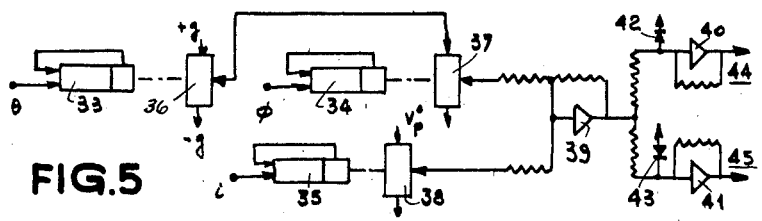
FIG.5
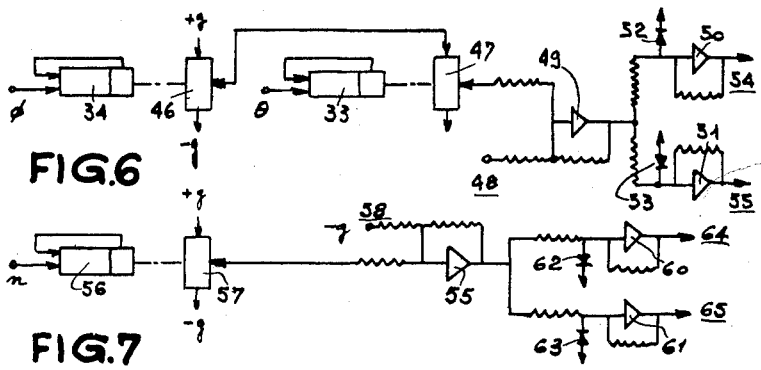
FIG.6
FIG.7
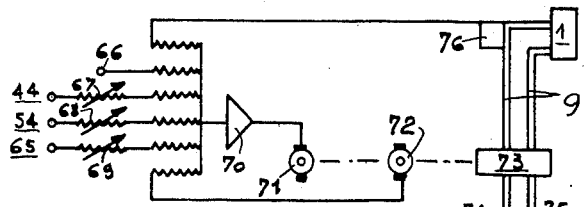
FIG.8
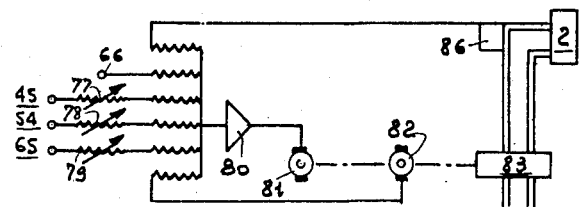
FIG.9
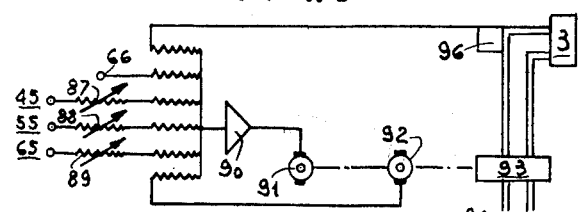
FIG.10

July 16, 1963

L. GAUCHER 3,097,436

METHOD AND MEANS FOR THE SIMULATION OF THE ACTION
OF MECHANICAL PARAMETERS ON A BODY

Filed Jan. 18, 1961

Inventor: Louis Gaucher
By Kenyon, Palmer, Stewart + Estabrook
Attorneys

United States Patent Office 3,097,436
Patented July 16, 1963

3,097,436
METHOD AND MEANS FOR THE SIMULATION OF THE ACTION OF MECHANICAL PARAMETERS ON A BODY
Louis Gaucher, 326 Rue Lecourbe, Paris 15, France
Filed Jan. 18, 1961, Ser. No. 83,417
Claims priority, application France Jan. 22, 1960
3 Claims. (Cl. 35—12)

The present invention concerns improvements in or relating to the simulation of the action of certain mechanical parameters on a body and is mainly concerned with the simulation of the action of accelerations and decelerations on the body of a pilot in flight simulators for ground training purposes.

A flight simulator essentially consists of a computer associated with an aircraft control gear. The computer integrates the control moves from the pilot and applies to the indicator apparatus the reactions of the craft without any motion of the said control gear, and mainly no motion of the pilot seat. The purpose of effectively simulating the accelerations and decelerations according to the invention is to apply to the pilot the very reactions of the simulated craft.

According to the invention, the method used for such a simulation of forces and especially accelerations and decelerations on a body consists of varying the fluid pressures within at least one pair of inflatable pockets or pouches supplied with a fluid and applied to portions of the body as being interposed between said body and fixed walls, under the control of analog signals varied according to parametric combinations of said force simulated values.

According to the invention, further, the equipment for the application of said method comprises the combination of a plurality of fluid pressure pouches interposed between the body and fixed walls, a computer delivering analog signals of the acceleration components according to predetermined directions of action, and a corresponding pluralitly of servo-mechanisms to the electrical inputs of which are applied predetermined combinations of the said analog signals and the mechanical outputs of which act on the fluid pressure distribution to the said pouches.

The invention will be fully described with reference to the accompanying drawings, wherein.

Figure 4:
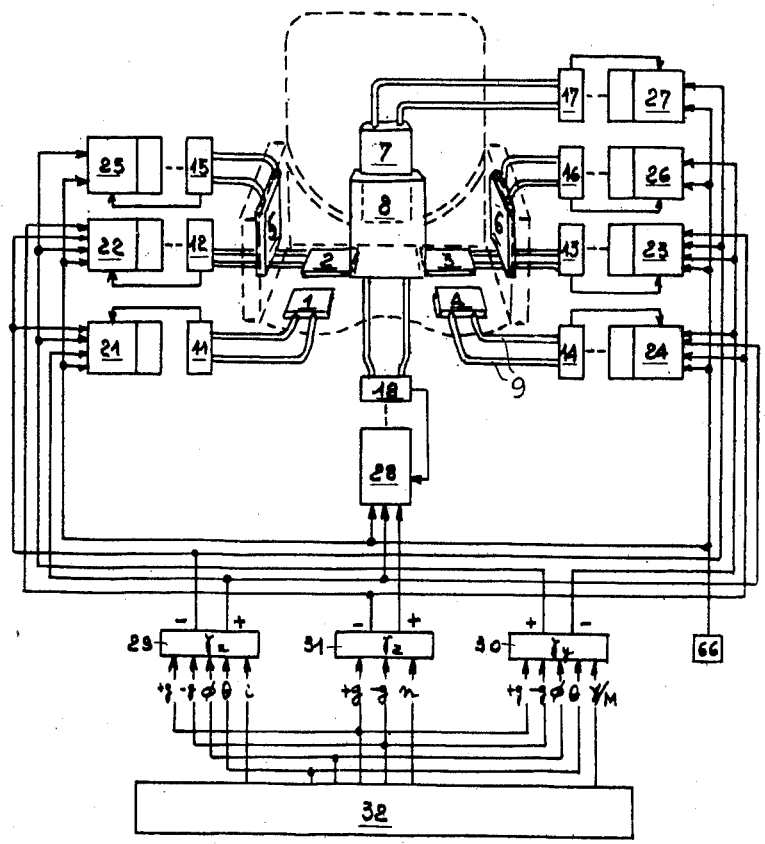
FIG. 4 shows an illustrative embodiment of a simulating device according to the invention for a pilot in a flight training simulator.

FIGS. 5 to 7 respectively show analog computation diagrams for the generation of analog voltages simulating the three acceleration components according to the reference axes of the simulated craft;

FIGS. 8 to 15 show respective servo-mechanisms for controlling the fluid pressures in the pouches of FIG. 4 from the analog voltages computed by the apparatus of FIGS. 5 to 7.

Figure 1:
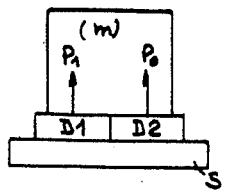
FIGS. 1 to 3 show, in three diagrams, the basic arrangement of the simulation of an acceleration according to the invention.
Figure 2:
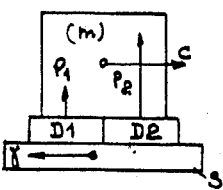
Figure 3:
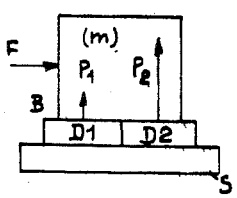

Referring to FIGS. 1 to 3, a body ($m$) lies on a base supporting member S with the intercalation of two pouches D1 and D2 which are filled with a fluid under pressure. The reacting forces are equal to have for values $P_1$ and $P_0$ in the rest condition of the arrangement, FIG. 1. Now, when an acceleration $\gamma$, FIG. 2, is imparted to the member S, parallel to the horizontal direction of said member for instance, the body ($m$) will be submitted to a torque C which rotates it until the reaction forces $P_1$ and $P_2$ of the elastic pouches generate a momentum which balances the torque C. But when, on the other hand, the member S remains still and a force F is applied to the body ($m$), said force being equal to $m.\gamma$, as shown in FIG. 3, one thus reproduces on the body the same effect as the acceleration on the supporting member; the body ($m$) rotates until same values of the forces $P_1$ and $P_2$ balance out the push of force F on the body. Of course, if the acceleration is not horizontal, an additional pouch must be provided on the opposite side of the body with respect to the direction of the non-horizontal component of the acceleration, said pouch being inserted between the body and a fixed supporting wall. The same conditions will thus be re-established for the two components of the acceleration, assuming the plane of the acceleration remains the same. Extension to the third dimension is obvious from the above.

From such an elementary structure operation, it is easily conceivable that, mutatis mutandis, when pressure variations are imposed on the fluid in the pouches in a coordinate fashion, a simulation of acceleration in its effects on the body ($m$) will be obtained.

It is this method of simulation which is provided in accordance with the invention, mainly for making the pilot of a simulated plane in an aircraft simulator equipment actually feel the accelerations and decelerations in response to his actuations of the controls of the craft. In this respect, an illustrative embodiment is shown in FIG. 4 which comprises eight pouches associated with the pilot's seat (in dot lines). Four of said pouches 1—2 and 3—4 are provided on the bottom, two of them 5 and 6 in the sides, one on the back as shown at 7 and the eighth pouch is provided on the safety belt as shown at 8, said belt being strapped to the back of the seat. The pouches 1 to 8 are connected by two-way ducts 9 to respective fluid tanks 11 to 18 the internal fluid pressures of which are respectively controlled by servo-mechanisms, 21 to 28. Such servo-mechanisms will be conventional ones when the tanks 11 to 18 will be mere pressure regulator containers, supplied from a single supply of fluid, as in such a case, the servo-mechanisms will merely have to act on the deliveries of stop-cocks inserted on the input or output feeds of said containers, provided a permanent flow be sustained through the hydraulic part of the equipment from and to the said fluid supply. According to the degree of opening of said stop-cocks, the pressures will vary in the pouches, which is the required effect of such servo-mechanisms.

As it is required to make the pilot feel the effects of acceleration and deceleration of the simulated craft in accordance to the simulated flight conditions, the electrical inputs of the servo-mechanisms are connected to combinations of electrical outputs delivering analog voltages from three computers 29, 30 and 31 wherein are computed the acceleration components $\gamma_x$, $\gamma_y$ and $\gamma_z$ from data which are elsewhere given and/or computed in the simulator equipment and, for instance are delivered by the general flight equation computer 32 of said equipment. This computer 32 will not be detailed as being conventional per se and for instance described in the following publication: "A study of the computer section of flight simulator" edited by Engineering Research Institute, Department of Aeronautical Engineering, University of Michigan (U.S.A.), March 1954.

$\gamma_x$ is the acceleration component along the axis X of the simulated flight, i.e. the longitudinal axis of the craft. $\gamma_y$ is the acceleration component along the lateral axis Y of the simulated craft and $\gamma_z$ is the acceleration component along the vertical axis Z of the simulated craft. These conventional orthogonal three axes define together the reference trihedral of coordinates linked to the craft.
Denoting:

$\overset{\circ}{V}_p$, the first derivative with respect to the time of the intrinsic speed of the simulated aircraft,
$i$, the angle of incidence of the aircraft, i.e. the angle between the direction of the speed and its longitudinal axis X, $\theta$, the balance of the craft, i.e. the angle between the longitudinal axis X and a horizontal plane passing by the centre of gravity of the craft, $\phi$, the lateral slant of the craft, i.e. the angle between the lateral axis Y of the craft and a horizontal plane passing by the centre of gravity thereof, and, $g$, the value of the gravity, all parameters issuing from the computer 32 as analog voltages, the component $\gamma_x$ is given by the known relation:

(i) $\qquad \gamma_x = \overset{\circ}{V}_p \cdot \cos i + g \cdot \sin \theta \cdot \cos \phi$ Denoting $F_y$, the lateral force according to the axis Y of the craft M, the mass of the craft, the parameter $F_y/M$ is delivered by the computer 32 as an analog voltage. The value of the component $\gamma_y$ of the acceleration is given by the known relation:

(ii) $\qquad \gamma_y = (F_y/M) + g \cdot \cos \theta \cdot \sin \phi$

Denoting $n$ the load coefficient of the simulated craft, which value is delivered from 32 as an analog voltage, the $\gamma_z$ component of the acceleration is given by the known relation:

(iii) $\qquad \gamma_z = (n-1) \cdot g = n \cdot g - g$

FIGS. 5, 6 and 7 show computer diagrams permanently issuing from the analog voltages thereabove defined and in accordance with said relations, analog voltages reproducing the accelerations according to the three axes X, Y and Z of the simulated aircraft. For each acceleration, two representations are available, one positive and one negative as both are needed for the control of the pouches by the respective servo-mechanisms.

Referring to FIG. 5, computation diagram of $\gamma_x$, 33 is a servo-mechanism receiving voltage $\theta$ as an input signal and actuating the slider of a potentiometer 36 which is a sine potentiometer fed across its terminals by the voltages $+g$ and $-g$. Said voltages are defined and generated in 32 and give the value of the gravity reference. 34 is a servo-mechanism receiving the voltage $\phi$ as an input signal and actuating the slider of a potentiometer 37 fed by the output signal from 36. 37 is a cosine potentiometer. From the slider of 36 issues a voltage representing $g \cdot \sin \theta$ and consequently, from the slider of 37 issues a voltage representing $g \cdot \sin \theta \cdot \cos \phi$ of relation (i). 35 is a servo-mechanism receiving the voltage $i$ as an input signal and actuating the slider of the cosine potentiometer 38 from which issues a voltage representing $\overset{\circ}{V}_p \cdot \cos i$ as said potentiometer is fed with said voltage $\overset{\circ}{V}_p$. Both terms are summed up in the summing amplifier 39. The output of 39 is connected to two amplifiers 40 and 41, the outputs of which respectively represent analog voltages $+\gamma_x$ and $-\gamma_x$ because in the inputs of said amplifiers are introduced sign or polarity discriminators such as 42 and 43. Said discriminators are for instance made of diode derivations. Not only the voltage representing the acceleration component $\gamma_x$ is computed in the circuit of FIG. 5 but the voltage is automatically routed according to the sign of the analog voltage on either the output 44 or the output 45.

FIG. 6 shows a diagram for the computer of $\gamma_y$ wherein the term $(F_y/M)$ is applied at 48 on one input of the summing amplifier 49 whereas the term $g \cdot \cos \theta$ is derived from the slider of the potentiometer 47 which is a cosine potentiometer driven by the servo-mechanism 33 and fed with the output from the slider of potentiometer 46, which is a sine potentiometer receiving the voltage difference $+g$, $-g$ across its winding terminals and driven by the servo-mechanism 34. The voltage issuing from 46 consequently represents $g \cdot \sin \theta$. The voltage from 47 is applied to an input of the summing amplifier 49 which then delivers a voltage representing $\gamma_y$ in accordance with relation (ii). Said voltage is routed by the diode discriminators 52 and 53 to the amplifiers 50 and 51 so that the output 54 delivers a voltage $+\gamma_y$ and the output 55, a voltage $-\gamma_y$ as the case may be.

The voltage representing $\gamma_z$ is supplied by the computer of FIG. 7 which essentially comprises a summing amplifier receiving the analog voltage $-g$ on one of its inputs and on its other input the voltage from the slider of a potentiometer 57 fed with the voltage difference $+g$, $-g$ and actuated by a servo-mechanism 56 receiving the load coefficient $n$ as issued from 32 in FIG. 4. The output of the summing amplifier 55 is routed by sign-discriminators 62 and 63 to the amplifiers 60 and 61 and consequently the output terminal 64 issues a voltage representing $+\gamma_z$ and the output terminal 65 issues a voltage representing $-\gamma_z$.

Of course, the servo-mechanisms 33 and 34 are both used in the computers of FIGS. 5 and 6 and are only duplicated on the drawings for the sake of clarity.

The voltages representing the accelerations (and decelerations when they are of negative sign) having thus been obtained, the servo-mechanisms for controlling the fluid pressures in the pouches 1 to 8 are shown in FIGS. 8 to 15. A further analog voltage is useful in this respect, viz. the voltage representing the reference pressure $P_0$. Such adjusted slider of a potentiometer across which is applied a constant voltage.

For defining said servo-mechanisms, the pressures within the pouches 1 to 8 will be termed $P_1$ to $P_8$ and use is made of parameters manually adjustable $f$, $h$ and $k$. These pressures are given by the following relations:

(iv) $P_1 = P_0 + f_1 \cdot (+\gamma_x) + h_1 \cdot (+\gamma_y) + k_1 \cdot (-\gamma_z)$
(v) $P_2 = P_0 + f_2 \cdot (-\gamma_x) + h_2 \cdot (+\gamma_y) + k_2 \cdot (-\gamma_z)$
(vi) $P_3 = P_0 + f_3 \cdot (-\gamma_x) + h_3 \cdot (-\gamma_y) + k_3 \cdot (-\gamma_z)$
(vii) $P_4 = P_0 + f_4 \cdot (+\gamma_x) + h_4 \cdot (-\gamma_y) + k_4 \cdot (-\gamma_z)$
(viii) $P_5 = P_0 + h_5 \cdot (+\gamma_y)$
(ix) $P_6 = P_0 + h_6 \cdot (-\gamma_y)$
(x) $P_7 = P_0 + f_7 \cdot (-\gamma_x)$
(xi) $P_8 = P_0 + f_8 \cdot (+\gamma_x) + k_8 \cdot (+\gamma_z)$ Each of said relations may be satisfied by a simple combination of a summing amplifier and a position controlled motor acting on a member modifying the pressure of the fluid in a pouch.

The servo-mechanisms of FIGS. 8 to 11 for the control of the pouches 1 to 4 are of a similar kind, each having a four input signal summing amplifier driving a servo-motor which controls the fluid pressure regulator of the circulation of the fluid through the corresponding pouch. Two feedbacks are provided in each servo-mechanism, one from a tachometer dynamo and the other one, static, from a pressure pick-up in the fluid duct of the pouch (said pick-up converting pressure into electric voltage for the feedback on the amplifier).

The diagrams of FIGS. 12 to 15 also are of the same kind but said diagrams are simplified in that the number of electrical inputs to their summing amplifiers are of reduced number with respect to the diagrams of FIGS. 8 to 11.

In FIGS. 8 to 15, the summing amplifiers are denoted 70, 80, 90, 100, 110, 120, 130 and 140 respectively, the motors by the references 71, 81, . . ., 141, the tachometers by the references 72, 82, . . ., 142, the pressure regulators by the references 73, 83, . . ., 143, the pressure pick-up devices by the references 76, 86, . . ., 146, and the inputs and outputs of fluid in and out the pressure regulators by the references 74—75, 84—85, . . ., 144—145. In each input resistance network one input is referred to as 66 and is the input of application of the $P_0$ representing voltage.

Figure 11:
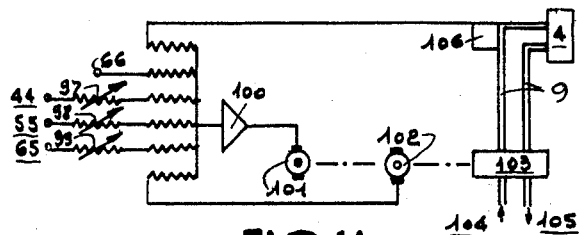
Figure 12:
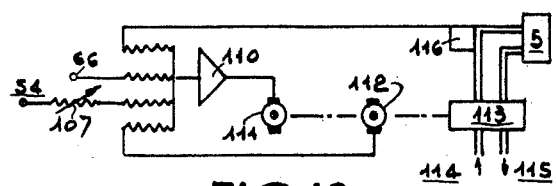
Figure 13:
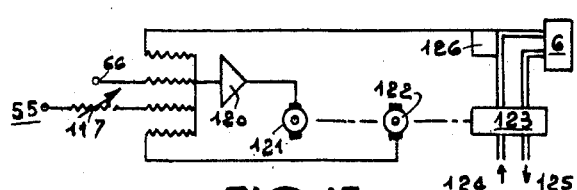
Figure 14:
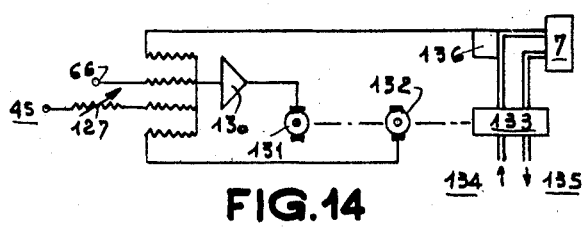
Figure 15:
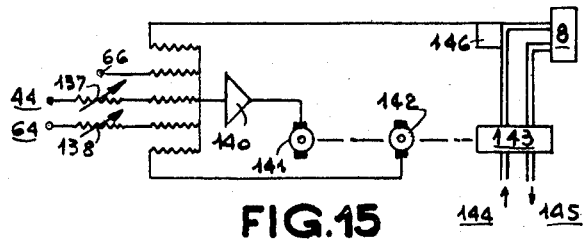

In accordance with the relations (iv) to (xi), the control device of FIG. 8 has its input terminals connected to the outputs 44, 54 and 65 of FIGS. 5 to 7 through adjustable resistances 67, 68 and 69 for introducing the coefficients $f_1$, $h_1$ and $k_1$; the device of FIG. 9 has its input terminals connected to the output terminals 45, 54 and 65 through resistances 77, 78 and 79 adjusted for the introduction of coefficients $f_2$, $h_2$ and $k_2$; the device of FIG. 10 has its input terminals connected to the terminals 45, 55 and 65 of FIGS. 5 to 7 through resistances 87, 88 and 89 adjusted for the introduction of coefficients $f_3$, $h_3$ and $k_3$; the device of FIG. 11 has its input terminals connected to terminals 44, 55 and 65 of FIGS. 5 to 7 through resistances 97, 98 and 99 adjusted for introducing the coefficients $f_4$, $h_4$ and $k_4$; the device of FIG. 12 has its input terminal connected to the output terminal 54 of FIG. 6 through resistance 107 adjusted for coefficient $h_5$; the device of FIG. 13 has its input terminal connected to the output terminal 55 of FIG. 6 through the adjustable resistance 117 for introduction of coefficient $h_6$; the device of FIG. 14 has its input terminal connected to the output terminal 45 of FIG. 5 through the adjustable resistance 127 introducing the coefficient $f_7$; the device of FIG. 15 has its input terminals respectively connected to terminals 44 and 64 of FIGS. 5 and 7, through respective resistances 137 and 138 adjusted for the introduction of coefficients $f_8$ and $k_8$.

What is claimed is:

1. In a flight training stimulator equipment, a device for simulating the effect of acceleration on the body of a person comprising the combination of a plurality of inflatable pouches arranged on parts of the seat, sides, and back of the pilot's seat and on the safety belt of said pilot, said pouches being filled with a fluid under pressure, an analog computer deriving analog voltages representing the components of acceleration according to directions of attitude of the simulated craft, and a corresponding plurality of servo-mechanisms controlled from combinations of analog voltages issuing from said analog computer and controlling the respective fluid pressures within said pouches.

2. In a flight training simulator equipment according to claim 1, at least one fluid duct connected to each of said pouches, and wherein each servomechanism controls at least one stop-cock in a fluid circulating duct to or from the corresponding pouches, said servo-mechanism comprising a servo-motor for mechanical control of said stop-cock and a summing amplifier for driving said motor in response to the combination of voltages representing input acceleration components applied to the input of the summing amplifier through respectively adjustable series resistors, and two feedback electrical paths, one from a tachometer driven by said motor and one from a pressure to electrical converter applied to said branch.

3. In a flight training simulator equipment according to claim 1, wherein said analog computer of the acceleration component voltages includes means for automatically routing a voltage representing an acceleration component to one of two outputs according to the polarity thereof from a summing amplifier of elementary voltages entering the constitution of said component.

References Cited in the file of this patent

UNITED STATES PATENTS

| | | |
|---|---|---|
| 2,485,292 | Kail | Oct. 18, 1949 |
| 2,802,541 | Albee | Aug. 13, 1957 |
| 2,851,795 | Sherman | Sept. 16, 1958 |